Dec. 1, 1942.     P. F. DIETZ     2,303,990
TACK CHANGING INDICATOR FOR SAILBOATS
Filed July 21, 1941
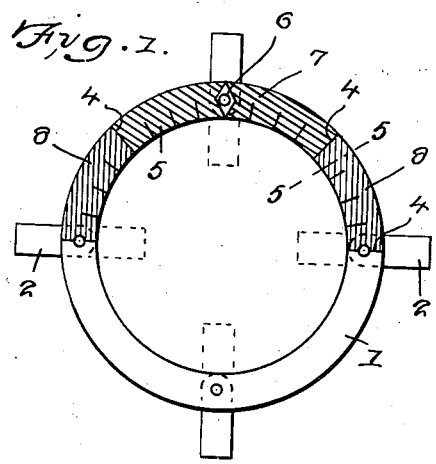
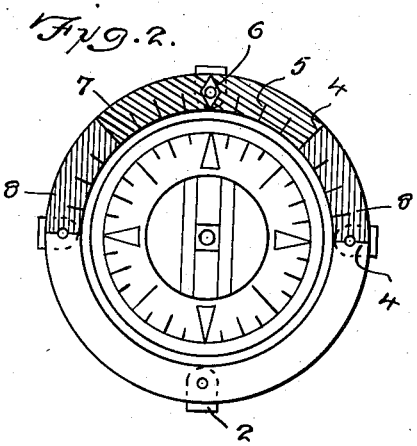
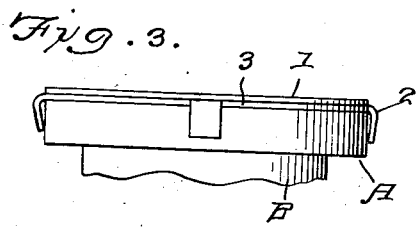
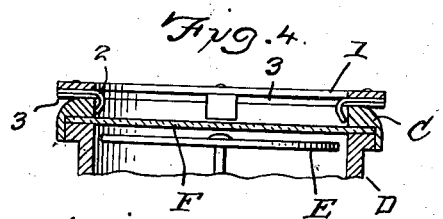
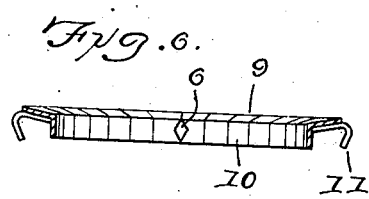
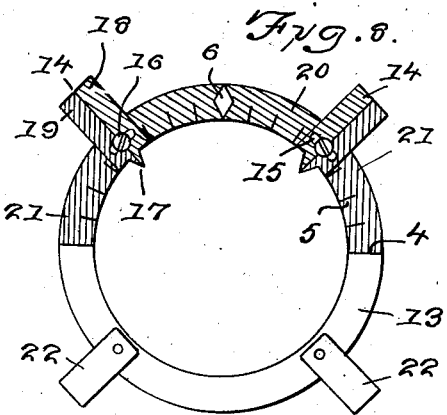
Paul F. Dietz
INVENTOR
BY Victor J. Evans & Co.
ATTORNEYS Patented Dec. 1, 1942

2,303,990

UNITED STATES PATENT OFFICE 2,303,990

TACK CHANGING INDICATOR FOR SAILBOATS

Paul F. Dietz, Kansas City, Mo.

Application July 21, 1941, Serial No. 403,415

8 Claims. (Cl. 33—222)

This invention relates to attachments for a mariner's compass, and its general object is to provide a device which I term a tack changing indicator that is primarily designed to be attached to and used with a compass on a small racing sailboat during a race, to indicate whether or not the boat is being properly tacked to bring about beating or windward sailing thereof, at the greatest possible speed and along the shortest route to the windward boundary marker of the race course, but of course the device can be used with a compass on any type of sailboat as well as at any time, and is particularly desirable for use by a novice to aid in beating along the shortest route to a destination especially when the wind is changeable.

A further object is to provide a device that can be attached and removed with respect to compasses having lens rims of various shapes, in an easy and expeditious manner, but casual removal or displacement of the device is practically impossible.

Another object is to provide a compass attachment that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a top plan view of one form of my device per se.

Figure 2 is a side view of the device attached to a compass provided with a rim or annulus having a vertical side and a flat top.

Figure 3 is a fragmentary side elevation of Figure 2.

Figure 4 is a fragmentary vertical sectional view taken through the device and illustrates the manner of attaching the same to a compass having a rounded sloping outer face.

Figure 5 is a sectional view taken approximately on line 5—5 of Figure 1.

Figure 6 is a vertical sectional view taken through a modified form.

Figure 7 is a perspective view of a further modified form.

Figure 8 is a top plan view of another modified or adjustable form.

Referring to the drawing in detail, and particularly to the form of Figures 1 to 4, it will be noted that the device of that form includes a flat ring 1 of the same diameter as that of the rim A of the compass B or the rim C of the compass D, the rim A having a flat top and a vertical side, while the rim C has a rounded sloping or beveled outer face. Other than the shape of the rims A and C, the compasses shown are identical and each includes a magnetically controlled compass card E covered by lens F that is held in place by its rim. The compass card is provided with the usual cardinal, intercardinal and minor points, as well as degree marks not shown. The compass points are of course lettered and the degree marks are numbered in the usual manner. The rims are each provided with the usual lubber line not shown, in that it is covered by my attachment. In any event, the compass parts are conventional and form no part of my invention.

Riveted or otherwise secured to the under face of the ring 1 in equidistantly spaced relation to each other are strip like lugs 2, there being four lugs in the form shown and they are initially extended outwardly from the ring, but when the device is applied to the rim A, the lugs are bent downwardly in clamping engagement with the outer vertical side or face thereof to hold the device fixed relative to the compass B, as shown in Figure 3. Fixed to the under face of the ring 1 is a gasket 3 of felt or the like, to not only protect the compass but to aid in holding the device thereon. In applying the device to the rim C, the lugs are directed inwardly and bent in clamping engagement with the inner face of the rim, as shown in Figure 4. When the device is secured to the rim C, the gasket is disposed between the lugs and the rim, and the gasket may have tabs thereon for disposal between the lugs and the rim A, when the device is attached to the compass B.

The ring is made from any suitable material for marine use, such as brass, and the same is true with respect to the lugs, but regardless of the material from which the lugs are made, they must be freely bendable and remain in the position bent, as well as be provided with a certain amount of resiliency in order to set up a clamping action against the rim.

One-half of the ring on the upper face thereof is marked with graduation lines 4 and 5 into sixteen compass points, that is the lines 4 and 5 are arranged eleven and one quarter degrees apart and the forty-five and ninety degree point lines 4 extend for the entire width of the ring, while the point lines 5 extend from the inner edge of the ring for half of its width, as clearly shown in Figures 1 and 2. At the zero point, or in other words midway between the forty-five degree point lines 4, is a diamond shaped indicator or lubber line positioning mark 6, and that portion or area 7 of the upper face of the ring between the forty-five degree point lines 4 is colored green, while the areas 8 between the latter lines and the ninety point lines 4 are colored red, therefore it will be seen that the green area includes eight compass points, four on each side of the lubber line positioning mark 6 and that each red area includes four compass points. The remaining portion of the upper face of the ring may or may not be colored, but in any event it is of a color contrasting that of the areas 7 and 8. The diamond shaped mark 6 is preferably colored black or any other color to render the same clearly distinguishable.

The form of Figure 6 includes a ring 9 that is inclined downwardly from its outer edge to fit a compass rim having a beveled upper face that is inclined accordingly, and formed on the inner edge of the ring 9 is a downturned marginal flange 10 to fit the inner face of the rim. This form likewise includes clamping lugs or clips 11 riveted or otherwise secured to the under face of the ring 9, for detachably securing the device to the compass.

The form of Figure 7 consists only of a narrow cylindrical ring 12 of a diameter to fit within the compass rim against the lens, and the ring 12 preferably has a frictional fit with the rim, or any suitable means may be used for securing the same against casual movement. The inner face of the ring 12 is graduated, colored and marked in exactly the same manner as that of the ring 1, and the same is true with respect to the inner face of the flange 10. In fact, the upper face of the ring 9 can be graduated, colored and marked accordingly.

Regarding the adjustable form of Figure 8, it might be mentioned here, that the average sailboat will tack or sail properly in a windward direction, within four compass points, or forty-five degrees of the direction of the wind, and that is the reason I provide four points on each side of the mark 6 within the green or proper tacking area of the device, but there are some boats that can be properly tacked within three and one-half points, while others can be tacked only as close as four and one-half points, therefore I provide the form of Figure 8 which is adjustable to perform its intended function at peak efficiency on any sailboat regardless of its tacking ability.

The form of Figure 8 includes a flat ring 13, graduated, colored and marked in exactly the same manner as the ring of the form of Figures 1 to 4, but the ring 13 has two adjustable strip lugs 14, each being slotted transversely adjacent one end as at 15, and the slots are for the purpose of receiving screw bolts 16 for securing the lugs 14 to the upper face of the ring 13. Each lug 14 is formed with a pointer 17 extending inwardly beyond the inner edge or periphery of the ring 13, and one longitudinal half portion 18 of each lug 14 is colored green, while the other half portion 19 is colored red. The lugs 14 are secured to its ring for disposal at and for movement circumferentially upon opposite sides of the forty-five degree point lines, and so that the green and red portions of the lugs extend respectively within the green and red areas 20 and 21 of the ring, as shown. Strip lugs 22 are secured to the upper face of the ring 13 for cooperation with the lugs 14 to attach the ring 13 to the compass rim, in the same manner as the lugs 2, in Figure 3, it being obvious that the lugs 14 are adjustable to a position in accordance with the tacking ability of the boat to which this form is to be used.

While the following will be obvious to those skilled in the art of sailing, it might be mentioned that a sailboat cannot sail directly into the wind, but it must be tacked or in other words steered on a zigzag course to bring about trimming or disposal of the sails at alternate angles to the direction of the wind, in order for the boat to proceed in an opposite direction or against the wind, and as previously set forth, the average racing sailboat will tack properly within four points or forty-five degrees of the direction of the wind, with the result it will be apparent that by the use of my device, it can be ascertained at a glance, whether or not the boat is sailing on what is termed a winning or a losing tack, when proceeding to a given point or where racing to the windward boundary marker on the race course.

In the use of my device for boat racing on a given or surveyed course, having markers at the ends of the legs or routes to be sailed, the skipper of the boat ascertains the compass bearing point for the windward leg. The skipper then heads the boat in a direction, so that a line running fore-and-aft through the center of the boat is on the ascertained bearing point to the windward marker. The device is then attached to the compass, so that the diamond shape mark 6 coincides with the lubber line of the compass. In tacking, when the bearing point shows within the green area of the device, it is a known fact that the boat is sailing on a winning tack or is within four points or less of the direction of the windward marker. If the bearing point on the compass shows within the red area, it is then known that the boat is sailing on a losing tack, or is beyond forty-five degrees of the direction of the windward marker, therefore should be moved about to the opposite tack which will be a shorter course to the windward marker.

However, it is not necessary that the device be attached to the compass for the mark 6 to coincide with the lubber line, as in the event the bearing point of the windward marker is not one of the cardinal or intercardinal points, but is one of the minor points, which is hard to see especially from a distance, the device can then be disposed on the compass, so that the mark 6 coincides with a chosen cardinal or intercardinal point, adjacent the bearing point of the windward marker, and then when the chosen point shows within the green area of the device, the boat will be sailing on a winning tack. It will be obvious that the skipper can more easily follow a cardinal or intercardinal point than some minor point of the compass, since with his duties of tending to the sail and the tiller, he may be too far away from the compass to see the true bearing point of the windward marker but can readily see a cardinal or intercardinal point.

From the foregoing, the use and the reason for adjusting the form of Figure 8 will be obvious, and it is thought that further comment is unnecessary, but it might be mentioned that when the form of Figure 8 is attached to the compass of a boat and the tacking ability thereof is known, the lugs 14 are adjusted in accordance therewith, or in other words they are adjusted on the ring 13, within three and one-half, four or four and one-half compass points.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A tack changing indicator for use with a compass on a sailboat, comprising means provided with an indicating mark and being graduated in compass points to ninety degrees of a circle from and upon opposite sides of said mark, the area of said graduated means between the forty-five degree points being colored, the area from said forty-five degree points to the ninety degree points being of the same color but contrasting that of the first mentioned area, and said first mentioned means adapted to be attached to said compass with said mark coinciding with a known point on said compass that relates to a windward bearing for cooperation of said areas with said point to indicate the tacking position of the boat relative to said windward bearing.

2. A tack changing indicator for use with a compass on a sailboat, comprising a flat ring provided with a lubber line indicating mark and being graduated in compass points to ninety degrees of a circle from and upon opposite sides of said mark, the area of the ring between the forty-five degree points being colored red, the areas from the forty-five degree points to the ninety degree points being colored green, and said ring adapted to be attached to said compass with said mark coinciding with the lubber line thereof for cooperation of said areas with the points of said compass to indicate the tacking position of the boat relative to a windward bearing.

3. A tack changing indicator for use with a compass on a sailboat, comprising a flat ring provided with an indicating mark and being graduated in compass points to ninety degrees of a circle from and upon opposite sides of said mark, the area of the ring between the forty-five degree points being colored red, the areas from the forty-five degree points to the ninety degree points being colored green, and means for clamping the indicator to said compass with said mark coinciding with a known point on said compass that relates to a windward bearing for cooperation of said areas with said point to indicate the tacking position of the boat relative to said windward bearing.

4. A tack changing indicator for use with a compass on a sailboat, comprising a flat ring provided with an indicating mark and being graduated in compass points to ninety degrees of a circle from and upon opposite sides of said mark, the area of the ring between the forty-five degree points being colored red, the areas from the forty-five degree points to the ninety degree points being colored green, and bendable strip lugs secured to the ring and extending from the outer periphery thereof for clamping said indicator to said compass with said mark coinciding with a known point on said compass that relates to a windward bearing for cooperation of said areas with said point to indicate the tacking position of the boat relative to said windward bearing.

5. A tack changing indicator for use with a compass on a sailboat, comprising a flat ring inclined downwardly from its outer edge to its inner edge, a downturned marginal flange formed on the inner edge of the ring, said flange provided with an indicating mark and being graduated in compass points to ninety degrees of a circle from and upon opposite sides of said mark, the area of the flange between the forty-five degree points being colored red, the area from the forty-five degree points to the ninety degree points being colored green, and said indicator adapted to be attached to said compass with said mark coinciding with a known point on said compass that relates to a windward bearing for cooperation of said areas with said point to indicate the tacking position of the boat relative to said windward bearing.

6. A tack changing indicator for use with a compass on a sailboat, comprising a narrow cylindrical ring provided with an indicating mark on its inner face, said face being graduated in compass points to ninety degrees of a circle from and upon opposite sides of said mark, the area of said ring between the forty-five degree points being colored red, the areas from the forty-five degree points to the ninety degree points being colored green, and said ring being of a diameter to frictionally fit within the compass and mounted therein with said mark coinciding with a known point on said compass that relates to a windward bearing for cooperation of said areas with said point to indicate the tacking position of the boat relative to said windward bearing.

7. A tack changing indicator for use with a compass on a sailboat, comprising a ring provided with an indicating mark and being graduated in compass points to ninety degree of a circle from and upon opposite sides of said mark, the area of the ring between the forty-five degree points being colored, the areas from the forty-five degree points to the ninety degree points being of a color contrasting that of the first mentioned area, a pair of members each having a portion colored the same color as the second mentioned areas and the remaining portion of each member being colored the same color as the first mentioned area, said members being secured to the ring for adjustment circumferentially thereof at the juncture of said areas, and with the colored portions of said members that correspond to that of the areas overlying the same, and means fixed to said ring and together with said members being bendable for disposal in clamping engagement with the compass for securing the ring thereto, with said mark coinciding with a known point on said compass that relates to a windward bearing for cooperation of said areas and said members with said point to indicate the tacking position of the boat relative to said windward bearing.

8. A tack changing indicator for use with a compass on a sailboat, comprising a ring provided with an indicating mark and being graduated in compass points to ninety degrees of a circle from and upon opposite sides of said mark, the area of the ring between the forty-five degree points being colored, the areas from the forty-five degree points to the ninety degree points being of a color contrasting that of the first mentioned area, a pair of strip members each having a portion colored the same color as the second mentioned areas and the remaining portion of said members being colored the same color as the first mentioned area, said members being secured to the ring for adjustment circumferentially thereof at the juncture of said areas and with the colored portions of said members that correspond in color to that of the areas overlying the same, a pair of strip lugs fixed to said ring and together with said lugs being bendable for disposal in clamping engagement with said compass for securing the ring thereto, with said mark coinciding with a known point on said compass that relates to a windward bearing for cooperation of said areas and said strip members with said point to indicate the tacking position of the boat relative to said windward bearing, and a pointer on each of said strip members and extending beyond the inner periphery of the ring.

PAUL F. DIETZ.